(12) United States Patent
Morales et al.

(10) Patent No.: US 11,855,563 B2
(45) Date of Patent: Dec. 26, 2023

(54) MOTOR CONTROLLERS AND METHODS FOR CONTROLLING DRIVE CIRCUIT BYPASS SIGNALS

(71) Applicant: Regal Beloit America, Inc., Beloit, WI (US)

(72) Inventors: Luis D. Morales, Fort Wayne, IN (US); Zachary Joseph Stauffer, Fort Wayne, IN (US); Paul Bryan Snipes, Tipp City, OH (US)

(73) Assignee: Regal Beloit America, Inc., Beloit, WI (US)

( * ) Notice: Subject to any disclaimer, the term of this patent is extended or adjusted under 35 U.S.C. 154(b) by 913 days.

(21) Appl. No.: 15/954,027

(22) Filed: Apr. 16, 2018

(65) Prior Publication Data

US 2019/0319569 A1  Oct. 17, 2019

(51) Int. Cl.
*H02P 23/00* (2016.01)
*H02P 25/18* (2006.01)

(52) U.S. Cl.
CPC .................. *H02P 25/188* (2013.01)

(58) Field of Classification Search
CPC ......... H02P 1/26; H02P 25/188; H02P 27/047
USPC ...................................................... 318/772
See application file for complete search history.

(56) References Cited

U.S. PATENT DOCUMENTS

| | | | |
|---|---|---|---|
| 3,909,687 A | 9/1975 | Abbondanti | |
| 4,939,441 A | 7/1990 | Dhyanchand | |
| 5,068,590 A | 11/1991 | Glennon et al. | |
| 6,097,127 A * | 8/2000 | Rivera | H02P 25/188 310/179 |
| 7,081,735 B1 * | 7/2006 | Malkowski, Jr. | H02P 25/18 318/807 |
| 7,193,826 B2 | 3/2007 | Crane et al. | |
| 7,558,031 B2 | 7/2009 | Boren | |
| 7,598,628 B2 | 10/2009 | Zver et al. | |
| 7,800,339 B2 | 9/2010 | Gonzalez et al. | |
| 7,948,721 B2 | 5/2011 | Brunner et al. | |
| 7,952,316 B2 * | 5/2011 | Ganev | H02P 25/22 318/524 |
| 8,014,110 B2 | 9/2011 | Schnetzka et al. | |
| 8,779,698 B2 * | 7/2014 | Havard | F04D 27/004 318/470 |
| 9,018,882 B2 | 4/2015 | Mack et al. | |
| 9,450,530 B2 | 9/2016 | Zahora et al. | |
| 9,800,188 B2 | 10/2017 | Chretien et al. | |
| 2004/0067050 A1 * | 4/2004 | Woodward | H02P 25/04 388/804 |

(Continued)

*Primary Examiner* — Kawing Chan
*Assistant Examiner* — Gabriel Agared
(74) *Attorney, Agent, or Firm* — Armstrong Teasdale LLP

(57) ABSTRACT

Motor controllers and methods for controlling drive circuit bypass signals are provided. The motor controller includes a drive circuit configured to generate variable frequency power based on input power received from a power source, and a drive contactor coupled between an output of the drive circuit and the motor. The drive contactor is configured to couple the drive circuit to the motor when a drive enable signal is received from an external controller, and decouple a line power enable signal from a line contactor by the external controller based on a presence of the drive enable signal. The line contactor is configured to couple the motor directly to the power source when the line power enable signal is received by the line contactor.

17 Claims, 4 Drawing Sheets

(56) References Cited

U.S. PATENT DOCUMENTS

| | | | |
|---|---|---|---|
| 2005/0035664 A1* | 2/2005 | Zver | H02J 9/062 |
| | | | 307/115 |
| 2005/0057213 A1 | 3/2005 | Williams | |
| 2008/0290824 A1 | 11/2008 | Choi et al. | |
| 2012/0187886 A1* | 7/2012 | Mack | H02P 27/06 |
| | | | 318/503 |
| 2018/0262132 A1* | 9/2018 | Snipes | H02P 6/08 |

* cited by examiner

MOTOR CONTROLLERS AND METHODS FOR CONTROLLING DRIVE CIRCUIT BYPASS SIGNALS

BACKGROUND

The field of the disclosure relates generally to electric motors, and more specifically, to motor controllers and methods for controlling drive circuit bypass signals.

At least some known induction motors are fixed speed motors that operate most efficiently at line frequency power. Such induction motors exhibit uncontrolled acceleration during startup. Further, at low load conditions, such induction motors operate less efficiently. Alternatively, an induction motor may be driven with a variable speed motor controller to adapt motor speed to a load level. Such configurations are generally limited by power factor, electromagnetic interference, and electrical losses.

Providing a drive circuit for induction motors enables efficient operation at both high and low load conditions. For example, an induction motor operating a compressor in a heating, ventilation and air conditioning (HVAC) system may experience high load conditions during peak temperatures and low load conditions during milder temperatures. The drive circuit operates the induction motor using an inverter in a low-speed mode under low load conditions, and operates the induction motor using line frequency power in a high-speed mode under high load conditions.

Where two speed operation of an air moving motor and/or a fluid moving motor is sufficient for an application, a drive circuit may be used that has a reduced power rating relative to a power rating of the induction motor. Using a lower-power drive circuit improves efficiency at low speeds; however, if the drive circuit is undersized compared to the motor rating, it is unable to deliver the full current or full torque necessary to drive the induction motor at full speed.

In some instances, external controllers provide signals that enable a drive contactor or a line contactor depending on whether drive circuit generated power or line frequency power is desired. Some known systems use the drive circuit's software to monitor the status of each speed call from the external controllers and then enable/disable the drive circuit output accordingly. However, external controllers may provide little or no notice regarding a change in mode of operation from drive circuit operation to line operation, or vice versa. Often, the only notification is when the drive circuit actually receives a different enable signal from the external controller. Particularly, in the instance of transitioning from low-speed drive circuit operation to high-speed line frequency power operation, the drive circuit needs sufficient time (e.g., 8 mSec) to disable current output by the drive circuit before line frequency power is applied to the motor. Providing power to the motor simultaneously by both the drive circuit and the line frequency power source may cause current cross-feed (e.g., a short) in the system and/or damage to electronic components of the drive circuit.

BRIEF DESCRIPTION

In one embodiment, a motor controller for controlling drive circuit bypass signals is provided. The motor controller includes a drive circuit configured to generate variable frequency power based on input power received from a power source, and a drive contactor coupled between an output of the drive circuit and the motor. The drive contactor is configured to couple the drive circuit to the motor when a drive enable signal is received from an external controller, and decouple a line power enable signal from a line contactor by the external controller based on a presence of the drive enable signal. The line contactor is configured to couple the motor directly to the power source when the line power enable signal is received by the line contactor.

In another embodiment, an induction motor is provided. The induction motor includes a plurality of windings, and a motor controller coupled to the plurality of windings. The motor controller includes a drive circuit configured to generate variable frequency power based on input power received from a power source, and a drive contactor coupled between an output of the drive circuit and the plurality of windings. The drive contactor is configured to couple the drive circuit to the plurality of windings when a drive enable signal is received from an external controller, and decouple a line power enable signal from a line contactor by the external controller based on a presence of the drive enable signal. The line contactor is configured to couple the plurality of windings directly to the power source when the line power enable signal is received by the line contactor.

In yet another embodiment, a method of operating an induction motor is provided. The method includes providing a drive circuit configured to generate variable frequency power based on input power received from a power source, coupling a drive contactor between an output of the drive circuit and the induction motor, coupling, by the drive contactor, the drive circuit to the induction motor when a drive enable signal is received from an external controller, and decoupling, by the drive contactor, a line power enable signal from a line contactor by the external controller based on a presence of the drive enable signal. The line contactor is configured to couple the induction motor directly to the power source when the line power enable signal is received by the line contactor.

In yet another embodiment, a motor system for controlling a motor is provided. The motor system includes a drive circuit configured to generate variable frequency power based on input power received from a power source, and a line contactor coupled between the power source and the motor. The line contactor is configured to couple the power source to the motor when a line power enable signal is received, and decouple a drive enable signal from the drive circuit while receiving the line power enable signal. The drive enable signal is operable to enable the drive circuit to provide the variable frequency power to the motor.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
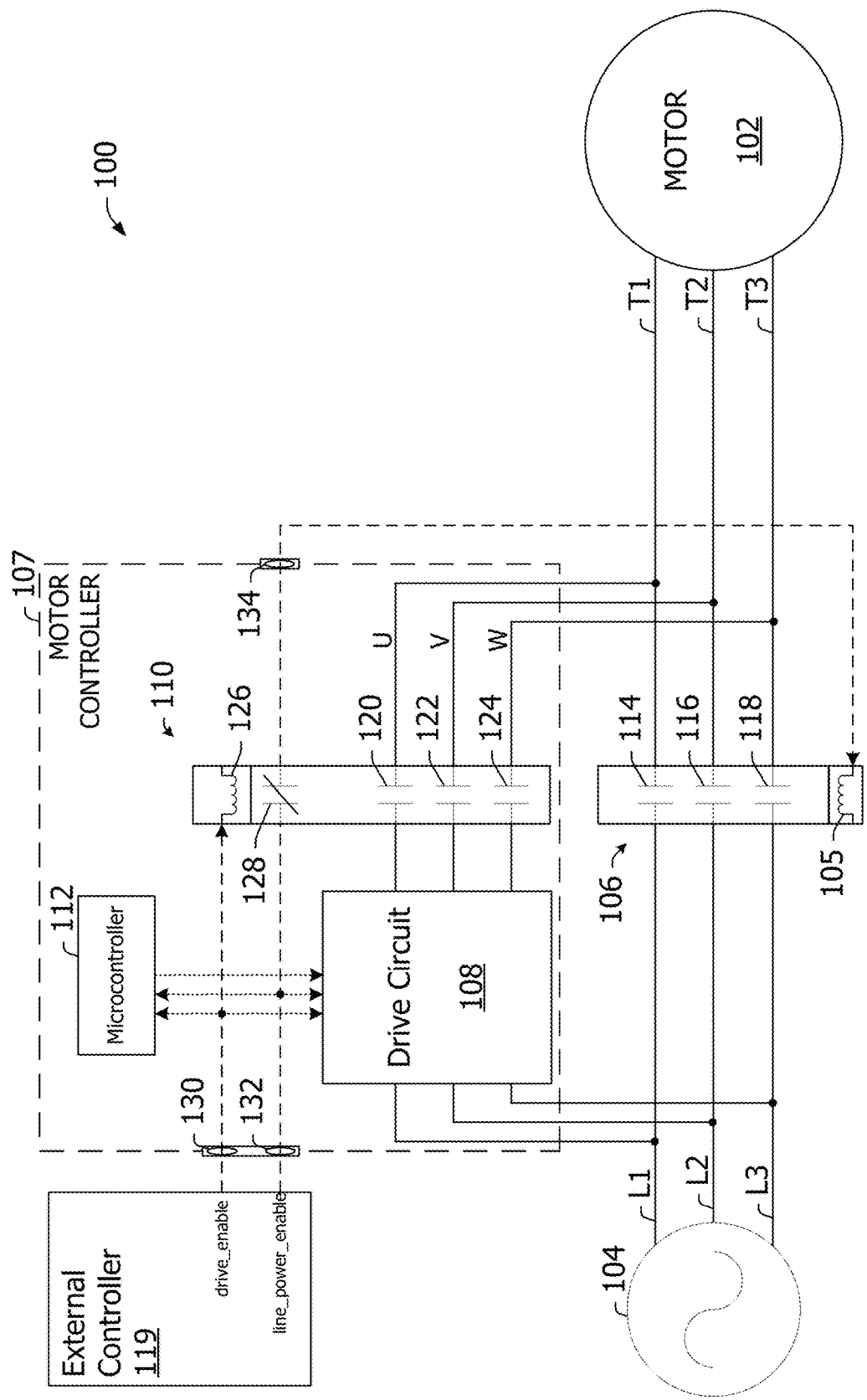
FIG. 1 is a block diagram of an exemplary motor system.

FIG. 1 is a block diagram of an exemplary motor system 100. Motor system 100 includes a motor 102, a power source 104, a line contactor 106, and a motor controller 107 that includes a drive circuit 108, a drive contactor 110, and a microcontroller 112.

In the exemplary embodiment, motor 102 is an AC induction motor or an electrically commutated motor (e.g., a permanent magnet AC motor with an integrated drive). In other embodiments, motor 102 may be any type of electric motor that enables motor system 100 to function as described herein, including, for example, any motor coupled to a variable frequency drive, etc. In some embodiments, motor 102 may be used in air moving applications used in the heating, ventilation, and air conditioning (HVAC) industry, may be used in fluid pumping applications, and/or may be used in commercial and industrial applications. In other embodiments, motor 102 may engage any suitable work component and be configured to drive such a work component. Motor 102 is a three-phase motor and includes motor conductors T1, T2, and T3 coupled to an input of motor 102 that are respectively coupled to each of the three phases, or windings, of motor 102. Alternatively, motor 102 may be a single-phase motor, a 2-phase motor, or may have any number of phases that enables motor 102 to function as described herein.

Motor 102 includes a first rated horsepower (HP) defining an amount of work motor 102 has the capacity to perform, a first rated voltage defining a specific voltage level or a combination of voltage levels (for dual-voltage or tri-voltage motors) at which motor 102 yields optimal performance, and a first rated speed defining an approximate speed of motor 102 when operated at rated voltage and frequency. For example, a motor may have a 4.9 HP rating with a 230V/460V voltage rating and a 1725 RPM speed rating. Motor 102 is configured to operate most efficiently at full speed where AC input power is applied directly to motor 102.

Motor system 100 is configured to be coupled to a power source 104 for receiving input power to drive motor 102. In the exemplary embodiment, power source 104 is an AC power source that generates three-phase AC power on line conductors L1, L2, and L3. Although described herein as being a three-phase power source, in some embodiments, power source 104 may generate single-phase AC power. Power source 104 provides three-phase, fixed voltage, and fixed frequency AC power from an AC power grid or distribution system (e.g., "utility" or "mains") that is present at an installation site of motor 102. Power source 104 may supply AC voltage or line voltage of 200V, 230V, 380V, 460V, or 600V, at a line frequency of 50 Hz or 60 Hz, onto line conductors L1, L2, and L3 depending on the corresponding AC power grid. Alternatively, power source 104 may supply any other voltage and/or frequency that enables motor system 100 to function as described herein.

Line contactor 106 is electrically coupled in series between power source 104 and motor conductors T1, T2, and T3 of motor 102. In the exemplary embodiment, line contactor 106 is a three-pole mechanical contactor that is commutated by energizing a coil 105. Line contactor 106 includes a first pole 114, a second pole 116, and a third pole 118, each coupled in series to three-phase power source 104 via respective line conductors L1, L2, and L3 (one conductor per phase). Alternatively, line contactor 106 may be a relay or any other switching device that enables line contactor 106 to function as described herein.

Line contactor 106 is closed, or activated, based on a line power enable signal received from an external controller 119 to operate motor 102 at a high-speed operating point. More specifically, in the exemplary embodiment, the line power enable signal closes line contactor 106 by energizing coil 105 to close poles 114, 116, and 118. This facilitates coupling power source 104 directly to motor 102. At high-speeds, line voltage from power source 104 is approximately equal to the first rated operating point associated with motor 102. By coupling power source 104 directly to motor 102, motor 102 is operated at full-rated speed using line voltage and frequency. This is the most efficient operating point of motor 102. Conversely, line contactor 106 is opened, or deactivated, when the line power enable signal is not received by line contactor 106.

Drive circuit 108 is coupled to line conductors L1, L2, and L3 of power source 104 at an input side and to series-coupled drive contactor 110 on an output side. An output of drive contactor 110 is coupled to motor conductors T1, T2, and T3 of motor 102. In the exemplary embodiment, drive circuit 108 is configured to convert AC power received from power source 104 to an AC power having a desired voltage and desired frequency to drive motor 102 at a low-speed operating point or various low speed operating points. Drive circuit 108 includes a second HP rating that is lower than the first HP rating of motor 102. In some embodiments, the second HP rating of drive circuit 108 is about ⅔ of the first HP rating of motor 102. In other embodiments, the second HP rating of drive circuit 108 is about ½ of the first HP rating of motor 102. However, drive circuit 108 may have any other rated HP that is lower than the first rated HP of motor 102 and enables drive circuit 108 to function as described herein. Drive circuit 108 enables use of the same physically smaller sized frame of AC motors in use today, while also providing at least one low-speed operating point. Motor 102 and drive circuit 108 are not merely limited to two-speed operation; rather, drive circuit 108 is capable of having any number of operating points so long as they do not exceed the rated HP of drive circuit 108.

Additionally, drive circuit 108 has a second rated voltage and a second rated speed, both of which are lower than the first rated voltage and the first rated speed associated with motor 102. That is, rather than motor system 100 including a VFD sized for the full operational range of motor 102 as with known motor systems, drive circuit 108 is sized for lower HP operation than motor 102 in order to improve efficiency at low-speeds and to prevent having to increase the frame size of motor 102.

Drive contactor 110 is configured to connect and disconnect drive circuit 108 to and from motor 102. Drive contactor 110 is a three-pole mechanical contactor that is commutated by energizing a coil. More specifically, in the exemplary embodiment, drive contactor 110 includes a plurality of power poles, which includes first pole 120, a second pole 122, and a third pole 124, each coupled in series to drive circuit 108 via respective output terminals U, V, and W. Drive contactor 110 also includes a coil 126 and an auxiliary contactor 128. In alternative embodiments, drive contactor 110 may be a three-pole solid state contactor, relay, or any other switching device that enables drive contactor 110 to function as described herein.

Coil 126 is configured to receive the drive enable signal from external controller 119 and control the closing and opening of poles 120, 122, and 124. More specifically, the drive enable signal is a voltage signal, for example, a 24 VAC signal, that energizes coil 126. When energized, coil 126 causes poles 120, 122, and 124 to close to thereby couple the output of drive circuit 108 to motor 102 for operating motor 102 at the low-speed operating point. Poles 120, 122, and 124 are opened, or deactivated, when the drive enable signal is not received by coil 126. In alternative embodiments, the voltage signal may have a different level of AC voltage, such as 12 VAC, 120 VAC, or any other level that enables the voltage signal to function as described herein. Further, the voltage signal may be a DC voltage signal or any other known type of command signal.

Motor controller 107 includes a drive enable terminal 130 for receiving the drive enable signal from external controller 119. The drive enable signal is routed to coil 126, where it controls whether drive contactor 110 is opened or closed. Motor controller 107 also includes a line power enable input terminal 132 for receiving the line power enable signal from external controller 119, and a line power enable output terminal 134 for transmitting the line power enable signal from motor controller 107 to line contactor 106.

Auxiliary contactor 128 is a "normally closed" contactor such that it is in a closed position when coil 126 is not energized. When coil 126 becomes energized by receiving the drive enable signal, it causes auxiliary contactor 128 to open.

In one embodiment, motor 102, drive circuit 108, and/or drive contactor 110 are all included within an integrated motor package. The integrated package is configured to be coupled to power source 104 and line contactor 106. Alternatively, motor 102, drive circuit 108, and/or drive contactor 110 may be separate components that are coupled together. Moreover, line contactor 106 may be included within the integrated motor package along with motor 102, drive circuit 108, and/or drive contactor 110.

Instead of the line power enable signal being provided directly to line contactor 106, in the exemplary embodiment, the line power enable signal is provided to line power enable input terminal 132 of motor controller 107. The line power enable signal is routed internally within motor controller 107, through auxiliary contactor 128, and to line power enable output terminal 134 of motor controller 107. Accordingly, when installing motor 102 with motor controller 107 integrated therein, a technician merely has to connect external controller 119 to provide the line power enable signal to line power enable input terminal 132 and, further, connect the line power enable output terminal 134 to provide the line power enable signal to line contactor 106.

During operation, because auxiliary contactor 128 is "normally closed," if a line power enable signal is provided by external controller 119, it is transmitted to line contactor 106 via auxiliary contactor 128. The line power enable signal activates and closes line contactor 106 to couple line frequency power directly to motor 102.

If a drive enable signal is then provided by external controller 119 to motor controller 107 while it is receiving the line power enable signal, the energizing of coil 126 automatically causes auxiliary contactor 128 to open. Opening auxiliary contactor 128 interrupts and/or decouples the line power enable signal from line contactor 106. If the line power enable and drive enable signals were simultaneously present at line contactor 106 and drive contactor 110, respectively, the electronics included in drive circuit 108 may become damaged or destroyed due to line frequency power and conditioned power from drive circuit 108 being present at the motor at the same time. Thus, routing the line power enable signal through drive contactor 110 and causing it to automatically be decoupled by presence of the drive enable signal provides self-protection for drive circuit 108 from line frequency power.

Additionally, if a line power enable signal is provided by external controller 119 while the drive enable signal is still being received, coil 126 is being energized. Accordingly, auxiliary contactor 128 is maintained in the open position, preventing the line power enable signal from closing line contactor 106.

In some instances, external controllers provide motor controller 107 with little or no notice that it is changing modes of operation from drive circuit operation to line operation or vice versa. Typically, the only notification is actually receiving a different enable signal from external controller 119. Particularly, when transitioning from drive circuit operation to line power operation, microcontroller 112 needs sufficient time (e.g., 8 mSec) to shut down operation of drive circuit 108 and disconnect drive circuit 108 from motor 102 by opening drive contactor 110. Routing the line power enable signal through drive contactor 110 not only provides motor controller 107 with some control over the line power enable signal, but also a delay in commutating drive contactor 110 causes a time delay that is sufficient for drive circuit 108 to cease operations and be disconnected from motor 102.

Figure 2:
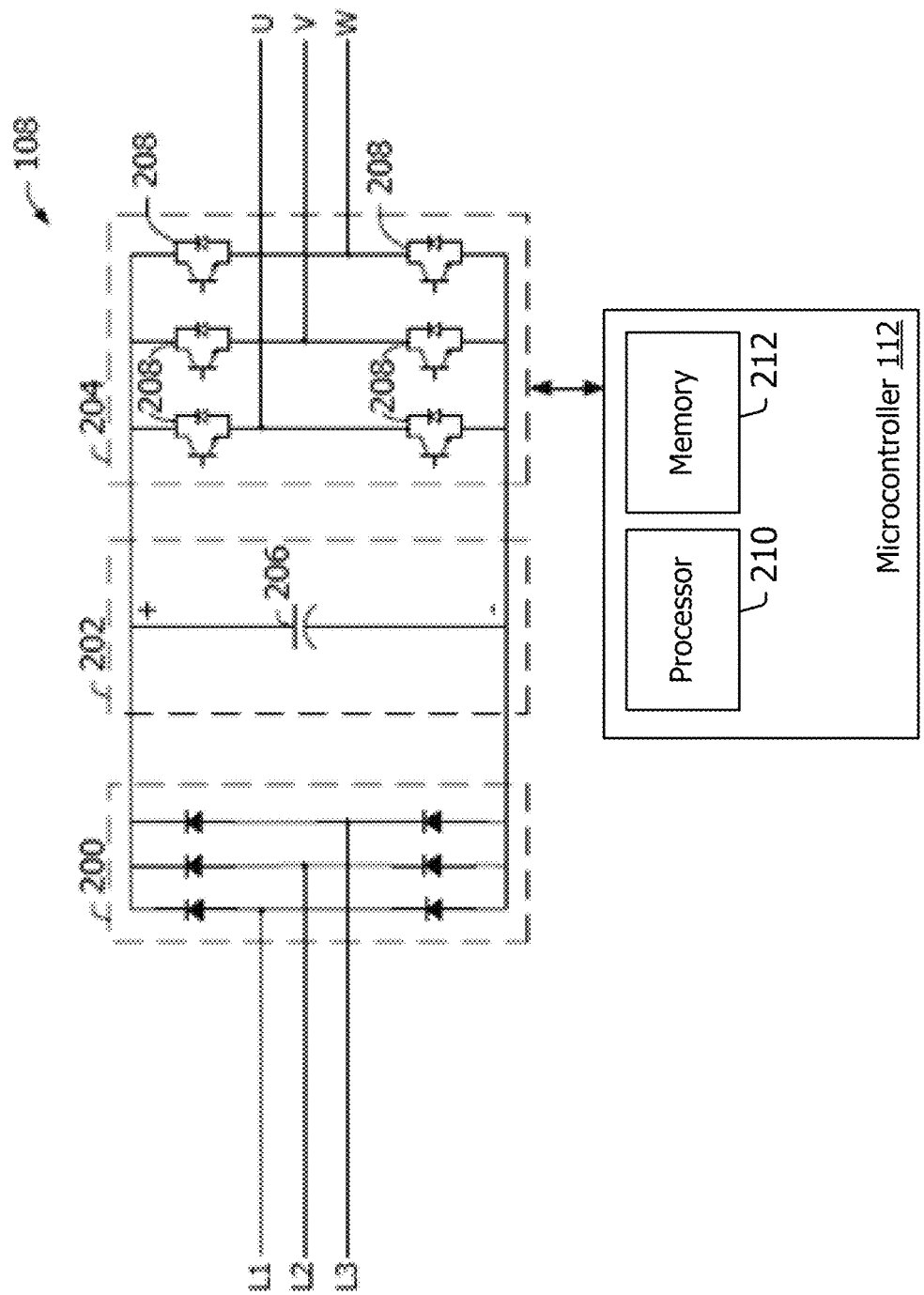
FIG. 2 is a schematic diagram of an exemplary drive circuit that may be used with the motor system shown in FIG. 1.

FIG. 2 is a schematic diagram of drive circuit 108 (shown in FIG. 1). Drive circuit 108 includes three stages: a converter 200, a DC link 202, and an inverter 204. Converter 200 converts the fixed line frequency, fixed line voltage AC power from power source 104 into DC power. For example, in the exemplary embodiment, converter 200 is a full wave bridge rectifier that converts three-phase AC power to DC power. DC link 202 filters the DC power from converter 200 using a filter 206, such as one or more capacitors. DC link 202 has rails labeled "+" and "−". Inverter 204 converts the DC power from DC link 202 into variable frequency, variable voltage AC power for motor 102. Inverter 204 is a pulse width modulation (PWM) inverter, using six switching devices 208, for example, IGBTs or MOSFETs. Switching devices 208 are connected in a three-phase bridge configuration to DC link 202 to generate AC power at inverter output terminals U, V, and W. Switching devices 208 are controlled, or pulsed, by signals on lines from microcontroller 112 (shown in FIG. 1).

Microcontroller 112 includes a processor 210 and a memory device 212. In the exemplary embodiment, microcontroller 112 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, microcontroller 112 is constructed of software and/or firmware embedded in one or more processing devices. In this manner, microcontroller 112 is programmable, such that instructions, intervals, thresholds, and/or ranges, etc. may be programmed for a particular motor 102 and/or an operator of motor 102. Microcontroller 112 may be wholly or partially provided by discrete components, external to one or more processing devices.

Processor 210 is coupled to inverter 204 to control switching devices 208 to output AC voltage for driving motor within the limits of the second HP rating of drive circuit 108. Processor 210 is further coupled to drive circuit 108 to control the speed at which motor 102 is operated when operated by drive circuit 108 based on settings stored in memory device 212.

In the exemplary embodiment, microcontroller 112 monitors the signal provided by external controller 119 to determine whether to utilize drive circuit 108. If a drive enable signal is detected, microcontroller 112 powers on and controls drive circuit 108 to generate and provide output voltage to motor 102. If a line power enable signal is detected, which will close line contactor 106 and apply line power to motor 102, microcontroller 112 powers off drive circuit 108 to protect it from being damaged by the application of line power.

In some embodiments, microcontroller 112 is configured to monitor the command signals provided by external controller 119 to drive contactor 110 and line contactor 106, and monitor voltage at drive output terminals U, V, and W to determine when to operate drive circuit 108 without damage. For example, microcontroller 112 ensures that voltage at drive output terminals U, V, and W does not exceed a threshold before drive circuit 108 is powered-on and drive contactor 110 is closed, because powering-on when line voltage is present may damage drive circuit 108 and/or motor 102. This monitoring and self-protection feature performed by microcontroller 112 eliminates the need for an additional circuit breaker that is typically required for protection during such operations.

As described above, drive circuit 108 is sized for lower HP operation than motor 102. For example, depending on the application in which motor 102 is to be installed, drive circuit 108 may be selected to have a ⅔ HP rating or a ½ HP rating relative to the first HP rating of motor 102. However, drive circuit 108 is not limited to these specific reduced HP ratings, but may be provided with any desired HP rating that is lower than the first HP rating of motor 102.

Drive circuit 108 is only used to drive motor 102 for low-speed operating points, below full-load operation. In the exemplary embodiment, drive circuit 108 is configured to provide a low-speed operating point for motor 102, such that motor 102 may be driven with at least two speeds, a low-speed (using drive circuit 108) and a high-speed (using power source 104). One low-speed operating point or a few different low-speed operating points may be defined in drive circuit 108, so long as the second HP rating of drive circuit 108 is not exceeded.

Figure 3:
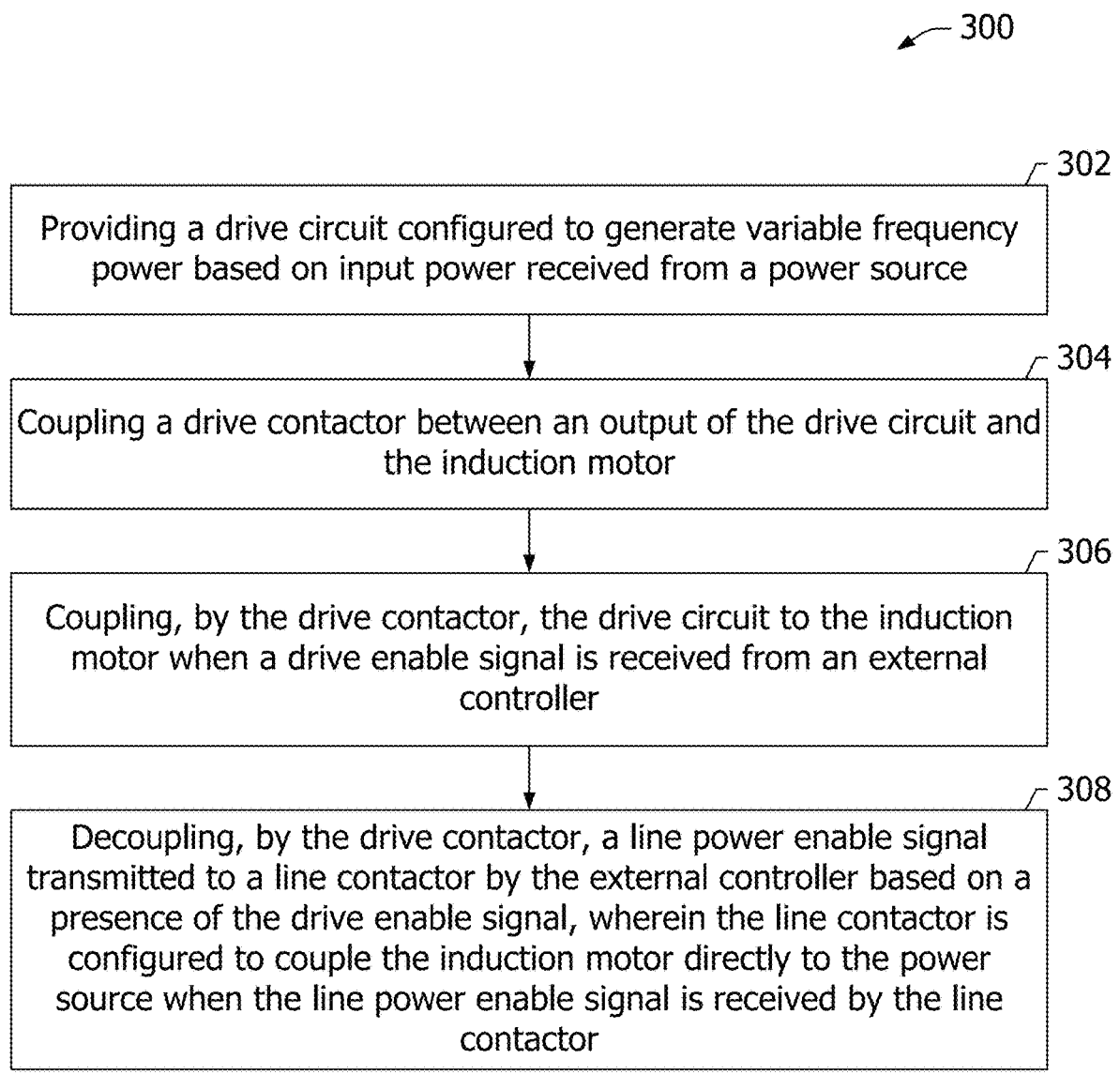
FIG. 3 is an exemplary control method for use with the motor system shown in FIG. 1.

FIG. 3 is an exemplary control method 300 for operating a motor that may be used with motor system 100, shown in FIG. 1. The motor is a three-phase motor and may be an AC induction motor or an ECM. The power source may be either a three-phase AC power source such as a utility or grid, or a single-phase AC source.

At step 302, method 300 includes providing a drive circuit configured to generate variable frequency power based on input power received from the power source. The drive circuit has a second rated horsepower that is lower than the first rated horsepower of the motor. The drive circuit may also have a rated voltage that is less than a rated voltage of the motor.

At step 304, method 300 includes coupling a drive contactor between an output of the drive circuit and the induction motor. Coupling the drive contactor may include providing a normally-closed auxiliary contact through which the line power enable signal is routed before transmission to the bypass converter, and coupling a coil to the normally-closed auxiliary contact.

At step 306, method 300 includes coupling, by the drive contactor, the drive circuit to the induction motor when a drive enable signal is received from an external controller. Coupling the drive circuit to the induction motor may include receiving, by the coil, the drive enable signal that energizes the coil. Coupling the drive circuit to the induction motor may also include closing, by the coil, a plurality of power poles coupled between an output of the drive circuit and the induction motor to provide the variable frequency power generated by the drive circuit to the induction motor.

At step 308, method 300 includes decoupling, by the drive contactor, a line power enable signal from a line contactor by the external controller based on a presence of the drive enable signal, wherein the line contactor is configured to couple the induction motor directly to the power source when the line power enable signal is received by the line contactor. Decoupling the line power enable signal may include causing, by the coil, the normally-closed auxiliary contact to open to decouple the line power enable signal from the line contactor when the coil is energized by receiving the drive enable signal. In another embodiment, and as explained above, decoupling the line power enable signal includes disabling the Low-Speed signal.

In one embodiment, method 300 further includes preventing, by the drive contactor, the line power enable signal from closing the line contactor and applying line power to the motor while the drive circuit is coupled to the motor to prevent damage to the drive circuit caused by simultaneous application of the line power and the variable frequency power to the induction motor.

In another embodiment, method 300 may also include detecting, by a drive circuit controller, when the line power enable signal is received by the drive circuit, disabling the drive circuit such that the drive circuit has no direct contact with the output leads of the line contactor when it is determined that the line power enable signal is being received.

In another embodiment, method 300 includes one of receiving, by a drive enable input terminal of the motor controller, the drive enable signal from the external controller and receiving, by a line power enable input terminal of the motor controller, the line power enable signal. When the line power enable signal is received by the line power enable input terminal, method 300 further includes transmitting, by a line power enable output terminal of the motor controller, the line power enable signal from the motor controller to the line contactor. In another embodiment, this includes receiving the Low-Speed enable signal.

Figure 4:
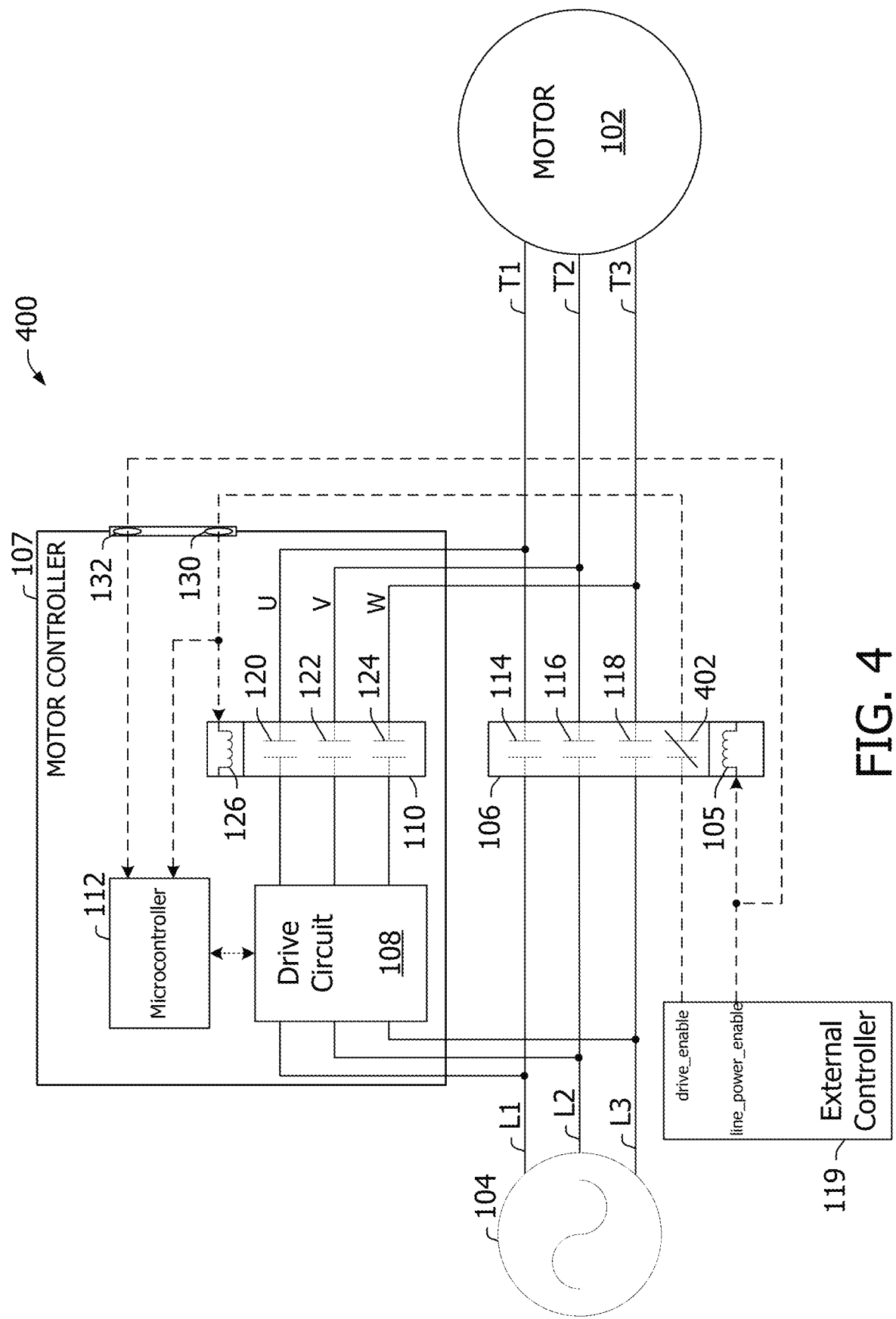
FIG. 4 is a block diagram of an exemplary motor system.

FIG. 4 is a block diagram of an exemplary motor system 400. Motor system 400 is substantially similar to motor system 100 (shown in FIG. 1), except motor system 400 includes line contactor 106 having an auxiliary contactor 402, rather than drive contactor 110 having an auxiliary contactor. As such, components shown in FIG. 4 that are common to both motor systems 100 and 400 are labeled with the same reference numbers used in FIG. 1, and only the differences between motor system 400 and motor system 100 will be described with respect to FIG. 4.

In the exemplary embodiment, line contactor 106 includes auxiliary contactor 402, which is a "normally closed" contactor such that it is in a closed position when coil 105 is not energized. When coil 105 becomes energized by receiving the line power enable signal from external controller 119, it causes auxiliary contactor 402 to open.

The drive enable signal from external controller 119 is routed through auxiliary contactor 402 and to drive enable input terminal 130 of motor controller 107. Accordingly, when installing motor 102 with motor controller 107 integrated therein, for the drive enable signal, a technician merely has to connect a conductor from external controller 119 to auxiliary contactor 402, and from auxiliary contactor 402 to drive enable input terminal 130.

During operation, because auxiliary contactor 402 is "normally closed," if a drive enable signal is provided by external controller 119, it is transmitted to drive contactor 110 via auxiliary contactor 402. The drive enable signal activates and closes drive contactor 110 to couple power generated by drive circuit 108 to motor 102.

If a line power enable signal is then provided by external controller 119 to line contactor 106 while it is receiving the drive enable signal, the energizing of coil 105 automatically causes auxiliary contactor 402 to open. Opening auxiliary contactor 402 interrupts and/or decouples the drive enable signal from drive contactor 110, causing drive circuit 108 to shut down.

Additionally, if a drive enable signal is provided by external controller 119 while the line power enable signal is still being received, coil 105 is being energized. Accordingly, auxiliary contactor 402 is maintained in the open position, preventing the drive enable signal from energizing coil 126 and closing drive contactor 110. When the line power enable signal is no longer received, coil 105 stops being energized and poles 114, 116, 118 open, disconnecting the direct connection of line frequency power from power source 104 to motor 102. Additionally, when coil 105 is no longer being energized, auxiliary contactor 402 returns to its normally closed position and couples the drive enable signal to drive contactor 110.

When transitioning from drive circuit operation to line power operation, microcontroller 112 typically needs sufficient time (e.g., 8 mSec) to shut down operation of drive circuit 108 and disconnect drive circuit 108 from motor 102 by opening drive contactor 110. However, rather than waiting for microcontroller 112 to receive the line power enable signal, motor system 400 automatically decouples the drive enable signal from drive contactor 110 at substantially the same moment the line power enable signal is received at line contactor 106. Decoupling the drive enable signal from drive contactor 110 causes drive contactor 110 to open and disconnect drive circuit 108 from motor 102. As such, routing the drive enable signal through line contactor 106 provides protection for motor controller 107 from damage caused by exposure to line frequency power.

The methods and systems described herein may be implemented using computer programming or engineering techniques including computer software, firmware, hardware or any combination or subset thereof, wherein the technical effect may include at least one of: (a) enabling a drive contactor to control a line power enable signal being transmitted to a line contactor from an external controller; (b) providing more reliable protection for drive circuit electronics by disabling a communication path between the external controller and the bypass device or the main device whenever a drive contactor is activated, or closed; (c) providing the drive circuit with sufficient time (e.g., 8 mSec) to shut off current output by the drive circuit before line power is applied without the use of software and in a cost-effective manner; and (d) reducing cost and complexity over fully variable frequency drives.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for controlling a motor, said motor controller comprising:
   a drive circuit configured to generate variable frequency power based on input power received from a power source;
   a drive contactor coupled between an output of said drive circuit and the motor, said drive contactor configured to couple said drive circuit to the motor when a drive enable signal is received from an external controller; and
   an auxiliary contactor through which a line power enable signal is routed, said auxiliary contactor coupled between the external controller and a line contactor, said auxiliary contactor configured to decouple the external controller from the line contactor when said auxiliary contactor detects a presence of the drive enable signal, wherein said auxiliary contactor decoupling is configured to prevent the line power enable signal from reaching the line contactor simultaneously with the drive enable signal reaching said drive contactor, and wherein the line contactor is configured to couple the motor directly to the power source when the line power enable signal is received by the line contactor, wherein said auxiliary contactor is configured to prevent the line power enable signal from closing the line contactor and applying line power to the motor while said drive circuit is coupled to the motor to prevent damage to said drive circuit caused by simultaneous application of the line power and the variable frequency power to the motor, and wherein said drive contactor comprises a coil that, when energized by receiving the drive enable signal, causes said auxiliary contactor to open to decouple the line power enable signal from the line contactor.

2. The motor controller of claim 1, wherein said drive contactor is further configured to maintain the auxiliary contactor open until said coil is not energized.

3. The motor controller of claim 1, wherein when the drive enable signal is not applied to said drive contactor, said drive contactor is open and said auxiliary contactor is closed.

4. The motor controller of claim 1, further comprising a plurality of power poles coupled to an output of said drive circuit, said plurality of power poles configured to be closed when said coil is energized to provide the variable frequency power generated by said drive circuit to the motor.

5. The motor controller of claim 1, further comprising a drive circuit controller configured to:
   detect when the line power enable signal is received by said motor controller; and
   disable said drive circuit such that said drive circuit has no direct contact with the output leads of said line contactor when it is determined that the line power enable signal is being received.

6. The motor controller of claim 1, further comprising:
   a drive enable input terminal for receiving the drive enable signal from the external controller;
   a line power enable input terminal for receiving the line power enable signal from the external controller; and
   a line power enable output terminal for transmitting the line power enable signal from said motor controller to the line contactor.

7. The motor controller of claim 1, wherein when the motor is coupled directly to the power source, the motor is driven at a rated speed of the motor using line frequency power.

8. The motor controller of claim 1, wherein said drive circuit is coupled to the motor, the motor is driven at a less-than-rated speed of the motor using the variable frequency power.

9. The motor controller of claim 1, wherein the drive enable signal and the line power enable signal include one of an alternating current voltage signal and a direct current voltage signal.

10. The motor controller of claim 1, wherein said drive contactor comprises one of a three-pole mechanical contactor, a three-pole solid state contactor, and a relay.

11. The motor controller of claim 1, wherein said motor controller, said drive contactor, and the motor are enclosed within an integrated motor package.

12. An induction motor comprising:
   a plurality of windings; and
   a motor controller coupled to said plurality of windings, said motor controller comprising:
      a drive circuit configured to generate variable frequency power based on input power received from a power source; and
      a drive contactor coupled between an output of said drive circuit and said plurality of windings, said drive contactor configured to couple said drive circuit to said plurality of windings when a drive enable signal is received from an external controller; and
      an auxiliary contactor through which a line power enable signal is routed, said auxiliary contactor coupled between the external controller and a line contactor, said auxiliary contactor configured to decouple the external controller from the line contactor when said auxiliary contactor detects a presence of the drive enable signal, wherein said auxiliary contactor decoupling is configured to prevent the line power enable signal from reaching the line contactor simultaneously with the drive enable signal reaching said drive contactor, and wherein the line contactor is configured to couple the motor directly to the power source when the line power enable signal is received by the line contactor, wherein said auxiliary contactor is configured to prevent the line power enable signal from closing the line contactor and applying line power to said plurality of windings while said drive circuit is coupled to said plurality of windings to prevent damage to said drive circuit caused by simultaneous application of the line power and the variable frequency power to said plurality of windings, and wherein said drive contactor comprises a coil that, when energized by receiving the drive enable signal, causes said auxiliary contactor to open to decouple the line power enable signal from the line contactor.

13. The induction motor of claim 12, wherein said drive circuit has a power rating that is lower than a power rating of said induction motor.

14. A method of operating an induction motor, said method comprising:
   providing a drive circuit configured to generate variable frequency power based on input power received from a power source;
   coupling a drive contactor between an output of the drive circuit and the induction motor;
   coupling, by the drive contactor, the drive circuit to the induction motor when a drive enable signal is received from an external controller;
   decoupling, by an auxiliary contactor through which a line power enable signal is routed and coupled between a line contactor and an external controller, the line contactor from the external controller when the auxiliary contactor detects a presence of the drive enable signal, wherein the auxiliary contactor decoupling is configured to prevent the line power enable signal from reaching the line contactor simultaneously with the drive enable signal reaching the drive contactor, and wherein the line contactor is configured to couple the induction motor directly to the power source when the line power enable signal is received by the line contactor;
   coupling a coil to the auxiliary contactor;
   causing, by the coil, the auxiliary contactor to open to decouple the line power enable signal from the line contactor when the coil is energized by receiving the drive enable signal
   receiving, by the coil, the drive enable signal that energizes the coil; and
   closing, by the coil, a plurality of power poles coupled between an output of the drive circuit and the induction motor to provide the variable frequency power generated by the drive circuit to the induction motor.

15. A motor system for controlling a motor, said motor system comprising:

a drive circuit configured to generate variable frequency power based on input power received from a power source; and a line contactor coupled between the power source and the motor, said line contactor configured to couple the power source to the motor when a line power enable signal is received from an external controller; and an auxiliary contactor through which a drive enable signal is routed, said auxiliary contactor coupled between the external controller and said drive circuit, said auxiliary contactor configured to decouple the external controller from said drive circuit when said auxiliary contactor detects a presence of the line enable signal, wherein said auxiliary contactor decoupling is configured to prevent the drive enable signal from reaching said drive circuit simultaneously with the line enable signal reaching said line contactor, wherein said auxiliary contactor is configured to prevent the drive enable signal from closing said drive contactor and enabling said drive circuit to apply variable frequency power to the motor while line frequency power is coupled to the motor to prevent damage to said drive circuit caused by simultaneous application of the line power and the variable frequency power to the motor, and wherein said line contactor comprises a coil or a circuit that, when energized by receiving the line power enable signal, causes said auxiliary contactor to open to decouple the drive enable signal from said drive contactor.

16. The motor system of claim 15, further comprising a drive contactor coupled between an output of said drive circuit and the motor, said drive contactor configured to couple said drive circuit to the motor when the drive enable signal is received from an external controller.

17. The motor system of claim 15, wherein when transitioning operation of the motor from line power operation to drive circuit operation, the routing of the drive enable signal through said line contactor delays the drive enable signal from closing said drive contactor until said line contactor is opened and line frequency power is no longer present on windings of the motor.

* * * * *